(12) United States Patent
Peddada et al.

(10) Patent No.: US 10,541,811 B2
(45) Date of Patent: Jan. 21, 2020

(54) SYSTEMS AND METHODS FOR SECURING DATA

(71) Applicant: salesforce.com, inc., San Francisco, CA (US)

(72) Inventors: Prasad Peddada, Alameda, CA (US); Jeremy Horwitz, San Francisco, CA (US); Taher Elgamal, San Francisco, CA (US); Matthew Steele, Oakland, CA (US); Ryan Guest, Stockton, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/635,265

(22) Filed: Mar. 2, 2015

(65) Prior Publication Data

US 2016/0261408 A1  Sep. 8, 2016

(51) Int. Cl.
  *H04L 9/08* (2006.01)

(52) U.S. Cl.
  CPC .......... *H04L 9/0894* (2013.01); *H04L 9/0861* (2013.01); *H04L 9/0877* (2013.01)

(58) Field of Classification Search
  CPC .... H04L 9/0894; H04L 9/0861; H04L 9/0877
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

Google Scholar search (Year: 2019).*

(Continued)

*Primary Examiner* — Mahfuzur Rahman
*Assistant Examiner* — Richard W Cruz-Franqui
(74) *Attorney, Agent, or Firm* — Dergosits & Noah LLP; Todd A. Noah

(57) ABSTRACT

Embodiments include an apparatus for securing customer data and include a processor, and one or more stored sequences of instructions which, when executed, cause the processor to store an encrypted first key fragment in a first storage area, store an encrypted second key fragment in a separate second storage area, wherein access to the first storage area and to the second storage area is mutually exclusive. The instructions further cause the processor to decrypt the encrypted first key fragment and the encrypted second key fragment using a key set and keys associated with a hardware security module based on receiving a request to derive a master key. The master key is derived using the decrypted first key fragment and the decrypted second key fragment and stored in an in-memory cache. The master key is used to encrypt or to decrypt encrypted customer data.

19 Claims, 15 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,957,335 B2* | 10/2005 | Foster | G06F 21/575 380/201 |
| 7,062,502 B1 | 6/2006 | Kesler | |
| 7,146,009 B2* | 12/2006 | Andivahis | H04L 63/06 380/277 |
| 7,231,516 B1* | 6/2007 | Sparrell | H04N 5/783 348/E7.056 |
| 7,340,411 B2 | 3/2008 | Cook | |
| 7,356,482 B2 | 4/2008 | Frankland et al. | |
| 7,380,125 B2* | 5/2008 | Di Luoffo | G06Q 20/341 380/277 |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,146,141 B1* | 3/2012 | Grandcolas | H04L 9/0825 726/5 |
| 8,209,308 B2 | 6/2012 | Jakobson et al. | |
| 8,275,836 B2 | 9/2012 | Beaven et al. | |
| 8,290,165 B2* | 10/2012 | Allen | H04L 9/0825 380/277 |
| 8,302,172 B2* | 10/2012 | Grandcolas | H04L 9/0825 726/5 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,572,673 B2* | 10/2013 | Duffy | G06Q 10/10 726/1 |
| 8,646,103 B2 | 2/2014 | Jakobson et al. | |
| 8,650,625 B2* | 2/2014 | Grandcolas | H04L 9/0825 726/5 |
| 8,892,908 B2* | 11/2014 | Lieber | H04L 9/085 713/194 |
| 8,897,446 B2* | 11/2014 | Bichler | H04L 9/0872 380/259 |
| 9,106,411 B2* | 8/2015 | De Atley | H04L 9/0861 |
| 9,165,158 B2* | 10/2015 | Li | H04L 9/083 |
| 9,204,297 B2* | 12/2015 | Morioka | H04L 9/0827 |
| 9,892,460 B1* | 2/2018 | Winklevoss | G06Q 40/04 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0126850 A1* | 9/2002 | Allen | H04L 9/0825 380/277 |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0039925 A1* | 2/2004 | McMillan | H04L 63/06 713/189 |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0263872 A1* | 11/2007 | Kirkup | H04W 12/04 380/273 |
| 2009/0063415 A1 | 3/2009 | Chatfield et al. | |
| 2009/0100342 A1 | 4/2009 | Rueben et al. | |
| 2009/0177744 A1 | 7/2009 | Marlow et al. | |
| 2010/0150341 A1* | 6/2010 | Dodgson | G06F 21/805 380/29 |

(56) References Cited

U.S. PATENT DOCUMENTS

| | | | |
|---|---|---|---|
| 2011/0252243 A1* | 10/2011 | Brouwer | H04L 9/0838 713/189 |
| 2012/0137359 A1* | 5/2012 | Szabo | H04L 9/0863 726/16 |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0275744 A1* | 10/2013 | Resch | H04L 63/0428 713/150 |
| 2014/0079076 A1* | 3/2014 | Kamble | H04L 49/9057 370/474 |
| 2014/0205089 A1* | 7/2014 | Irwin | H04L 9/0877 380/44 |
| 2014/0359291 A1* | 12/2014 | Wilson | G06Q 10/10 713/168 |
| 2014/0359537 A1 | 12/2014 | Jakobson et al. | |
| 2015/0003474 A1* | 1/2015 | Thomas | H04L 69/22 370/474 |
| 2015/0007050 A1 | 1/2015 | Jakobson et al. | |
| 2016/0044001 A1* | 2/2016 | Pogorelik | H04L 63/0428 713/168 |
| 2016/0087950 A1* | 3/2016 | Barbir | H04L 63/062 713/171 |
| 2016/0212109 A1* | 7/2016 | Hird | H04L 63/062 |
| 2016/0294553 A1* | 10/2016 | Hattori | H04L 9/3226 |

OTHER PUBLICATIONS

International Search Report and Written Opinion for PCT Application No. PCT/US2016/013257; dated Mar. 14, 2016.
U.S. Appl. No. 13/998,890.
U.S. Appl. No. 13/998,065.
U.S. Appl. No. 13/986,251.

* cited by examiner

SYSTEMS AND METHODS FOR SECURING DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to encrypting and decrypting data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Existing approaches for securing data (such as customer data) stored in a storage area (e.g., database, data stores, etc.) may be based on asymmetric or symmetric cryptography. With asymmetric cryptography, a pair of keys—a public key and a private key—is used. The customer data can be encrypted using the public key and decrypted using the corresponding private key. Typically it is very slow to encrypt data using public key of asymmetric key pair. Instead an acceptable practice is to encrypt data using a symmetric key. The symmetric key itself is encrypted with the public key thereby overcoming performance problems of asymmetric key cryptography.

BRIEF SUMMARY

For some embodiments, methods and systems for securing customer data in a multi-tenant database environment includes storing an encrypted first key fragment in a first storage area, and storing an encrypted second key fragment in a second storage area distinct from the first storage area. Access to the first storage area and to the second storage area is mutually exclusive. The first key fragment and the second key fragment have been encrypted using a key set. Based on receiving a request to derive a master key, the encrypted first key fragment and the encrypted second key fragment are decrypted using the key set and keys associated with a hardware security module (HSM). The master key is derived using the decrypted first key fragment and the decrypted second key fragment. The master key may be stored in an in-memory cache and used for encrypting or decrypting encrypted customer data.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
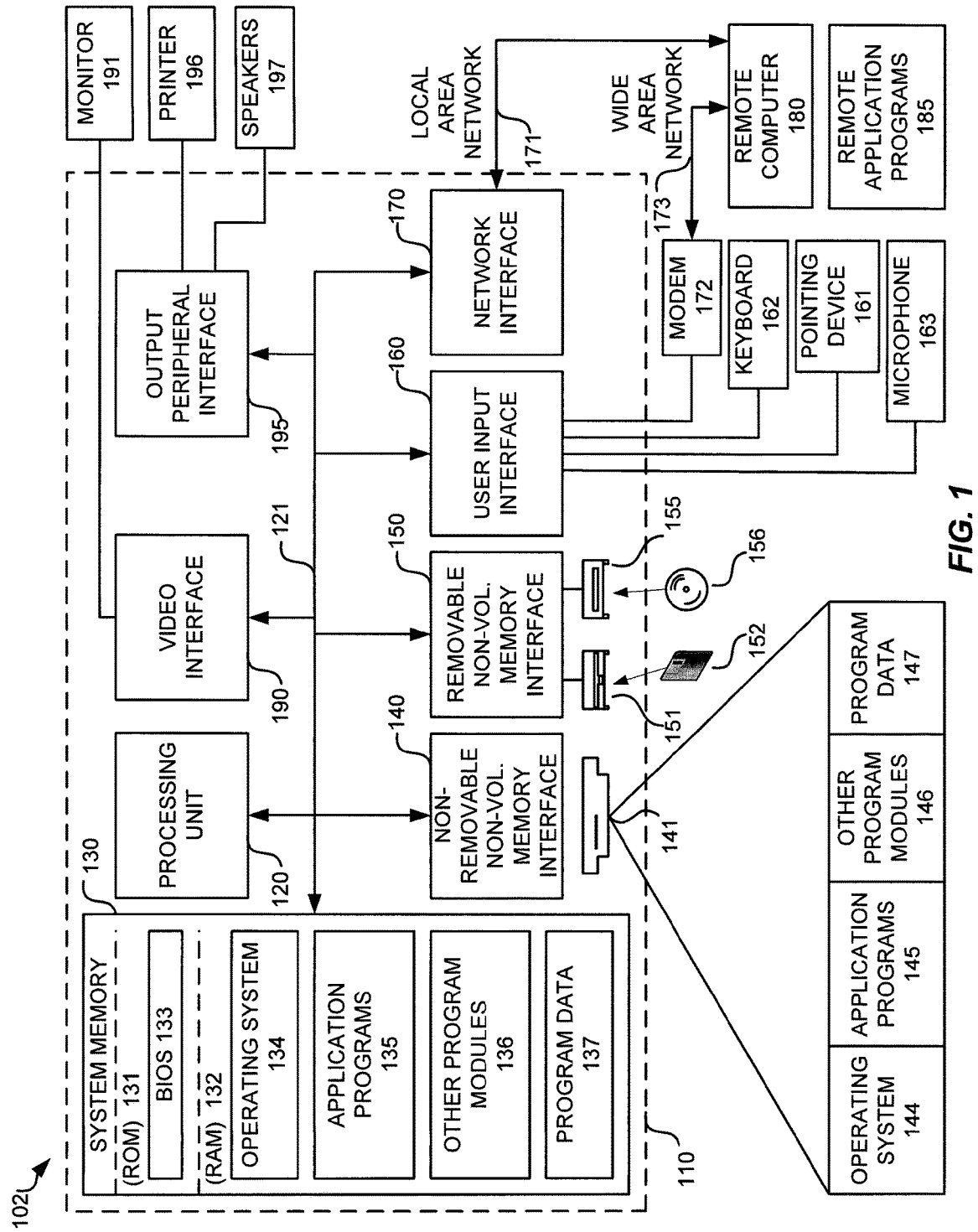
FIG. 1 shows a diagram of an example computing system 102 that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, a multi-tenant database environment may include multiple databases configured to store data associated with organizations or customers. The data (also referred to as customer data) may be unencrypted when it is stored by the customers. The customer data may be encrypted while it is at rest using asymmetric or symmetric cryptography. The encrypted customer data protects it from being accessed by any unauthorized users. While it may be important to encrypt the customer data, it may be desirable to secure the decryption key (private key or the symmetric key). The decryption key may be stored in a storage area that only certain authorized personnel can access (e.g., a database administrator). When the customer wants to retrieve the customer data, the encrypted customer data may be decrypted using the decryption key. The decrypted customer data may then be transmitted to the customer. The encrypted customer data may be stored in any storage area associated with the multi-tenant database environment, including cloud-based storage area, non-cloud-based storage area, or other forms of storage implementations.

One technique to protect a decryption key is to use a hardware security module (HSM). The HSM offers onboard secure key generation and onboard key storage and management. The HSM may be used to generate asymmetric key pairs. The HSM may hold the HSM private key in its storage such that the HSM private key cannot be extracted by anyone. The HSM private key may be used to decrypt data that has been encrypted using the corresponding HSM public key. A password may be required to use an HSM that is installed in a system. The HSM may be a Universal Serial Bus (USB) device connected via a USB port, or it may be a card device installed via a system board, or it could be a network attached device.

The disclosed embodiments may include a method for encrypting and decrypting customer data in a multi-tenant database environment. The method includes generating a symmetric key based on two key fragments including a first key fragment and a second key fragment. The first key fragment and the second key fragment may be generated using a random number generator and may be secured using at least keys in a hardware security module (HSM). The symmetric key is stored in an in-memory cache. The customer data may be encrypted using the symmetric key. The encrypted customer data may be decrypted using the symmetric key when the customer requests for the customer data.

The disclosed embodiments may include an apparatus for securing customer data and include a processor, and one or more stored sequences of instructions which, when executed by the processor, cause the processor to store an encrypted first key fragment in a first storage area, store an encrypted second key fragment in a second storage area distinct from the first storage area, wherein access to the first storage area and to the second storage area is mutually exclusive, and wherein the first key fragment and the second key fragment have been encrypted using a key set. The instructions further cause the processor to decrypt the previously encrypted first key fragment and the previously encrypted second key fragment using the key set and keys associated with a hardware security module (HSM) based on receiving a request to derive a master key. The master key is derived using the decrypted first key fragment and the decrypted second key fragment. The master key is stored in an in-memory cache.

The disclosed embodiments may include a machine-readable medium carrying one or more sequences of instructions for securing customer data, which instructions, when executed by one or more processors, cause the one or more processors to store an encrypted first key fragment in a first storage area, to store an encrypted second key fragment in a second storage area distinct from the first storage area, wherein access to the first storage area and to the second storage area is mutually exclusive, and wherein the first key fragment and the second key fragment have been encrypted using a key set. Based on receiving a request to derive a master key, the instructions, when executed by one or more processors, further cause the one or more processors to decrypt the previously encrypted the first key fragment and the previously encrypted second key fragment using the key set and keys associated with a hardware security module (HSM), to derive the master key using the decrypted first key fragment and the decrypted second key fragment, and to store the master key in an in-memory cache.

The disclosed embodiments may be related to encrypting and decrypting or securing customer data in a computer-implemented system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Computer System

FIG. 1 is a diagram of an example computing system that may be used with some embodiments of the present invention. The computing system 102 may be used by a customer or an organization to transmit customer data to be stored in a storage area associated with a multi-tenant database environment. For example, the multi-tenant database environment may be associated with the services provided by Salesforce.com®. The computing system 102 may also be used to retrieve the customer data from the storage area.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Network

Figure 2:
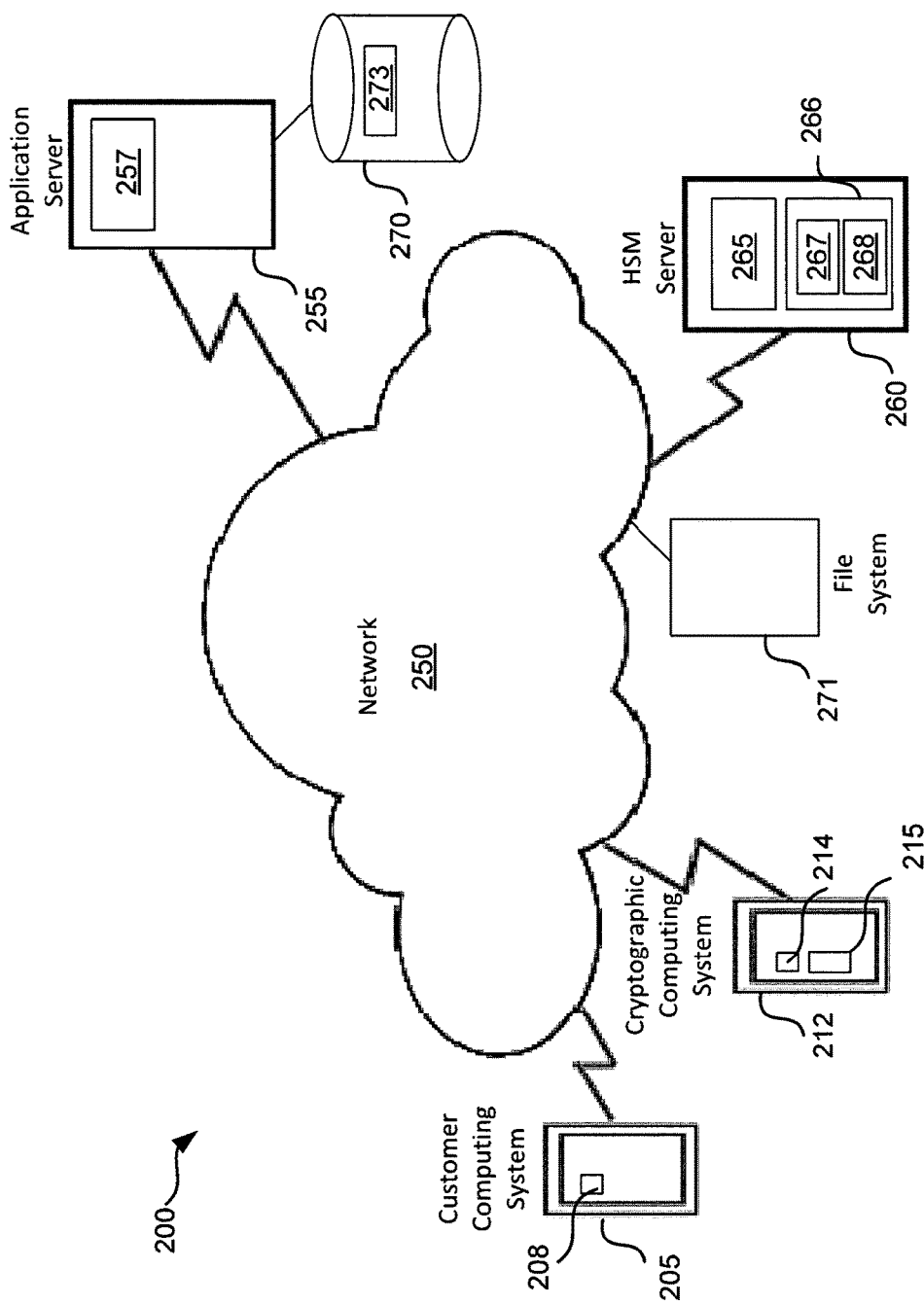
FIG. 2 shows a diagram of an example network environment 200 that may be used with some embodiments of the present invention.

FIG. 2 shows a diagram of an example network environment that may be used with some embodiments of the present invention. Network environment 200 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with one or more server computing systems 255 and 260 via the network 250.

The computing systems 205 may be associated with a customer and may include customer application module 208. A user may use the customer computing system 205 and the customer application module 208 to connect to and communicate with the server computing system 255 (also referred to as an application server 255) and log into application 257 (e.g., a Salesforce.com® application). The user may transmit customer data to the application server 255 and may request for the customer data from the application server 255.

The application server 255 may be coupled with database 270 configured to store the customer data. The application server 255 may be associated with an entity (e.g., Salesforce.com®). The entity may generate a key pair for cryptography. The key pair includes a public key 273 and a private key (not shown). The private key is not made available publicly, but kept secret by the entity (also referred to as the key holder). The public key 273 may be made available to anyone by means of a digital certificate issued by a certificate authority (CA). The certificate is also a confirmation or validation by the CA that the public key contained in the certificate belongs to the entity noted in the certificate. For example, a customer can download the certificate and get the public key 273 to encrypt the customer data to be transmitted to the application server 255. Only the entity (or holder of the private key) can decrypt the customer data that has been encrypted using the public key 273.

The application server 255 may be coupled with cryptographic computing system 212 configured with cryptographic application module 214. The cryptographic application module 214 may be configured to generate public keys, private keys, symmetric keys, and key fragments for one or more key releases, as described with FIG. 4A.

The application server 255 may be coupled with file system 271. The file system 271 may be configured with to store various encrypted keys including the keys generated by the cryptographic computing system 212.

The application server 255 may be coupled with the server computing system 260 (also referred to as the HSM server 260) configured with an HSM 266. The HSM 266 may be associated with an HSM public key 267 and an HSM private key 268. The HSM server 260 may include HSM application module 265 configured to interact with the HSM 266 and to perform various encrypting and decrypting operations. For example, the HSM application module 265 may use the HSM private key 268 to decrypt data previously encrypted using the corresponding HSM public key 267. A password may be required to access the HSM 266. For load balancing purposes, there may be multiple application servers 255 and multiple HSM servers 260 connected to a load balancer (not shown). All the application servers 255 may need to know which HSM servers 260 they can talk to at any particular time.

For some embodiments, the file system 271 may be synchronized with the file system local to the HSM server 260. This may enable the HSM server 260 to access and store data in the file system 271 as if the file system 271 is a local file system. For some embodiments, the HSM server 260 may only respond to inquiries transmitted by the application server 255. This may prevent access to data or services associated with the HSM server 260 by any unauthorized users. For example, the application server 255 may need to digitally sign every request that it sends to the HSM server 260 using a secret that they share.

Key Fragments

Figure 3A:
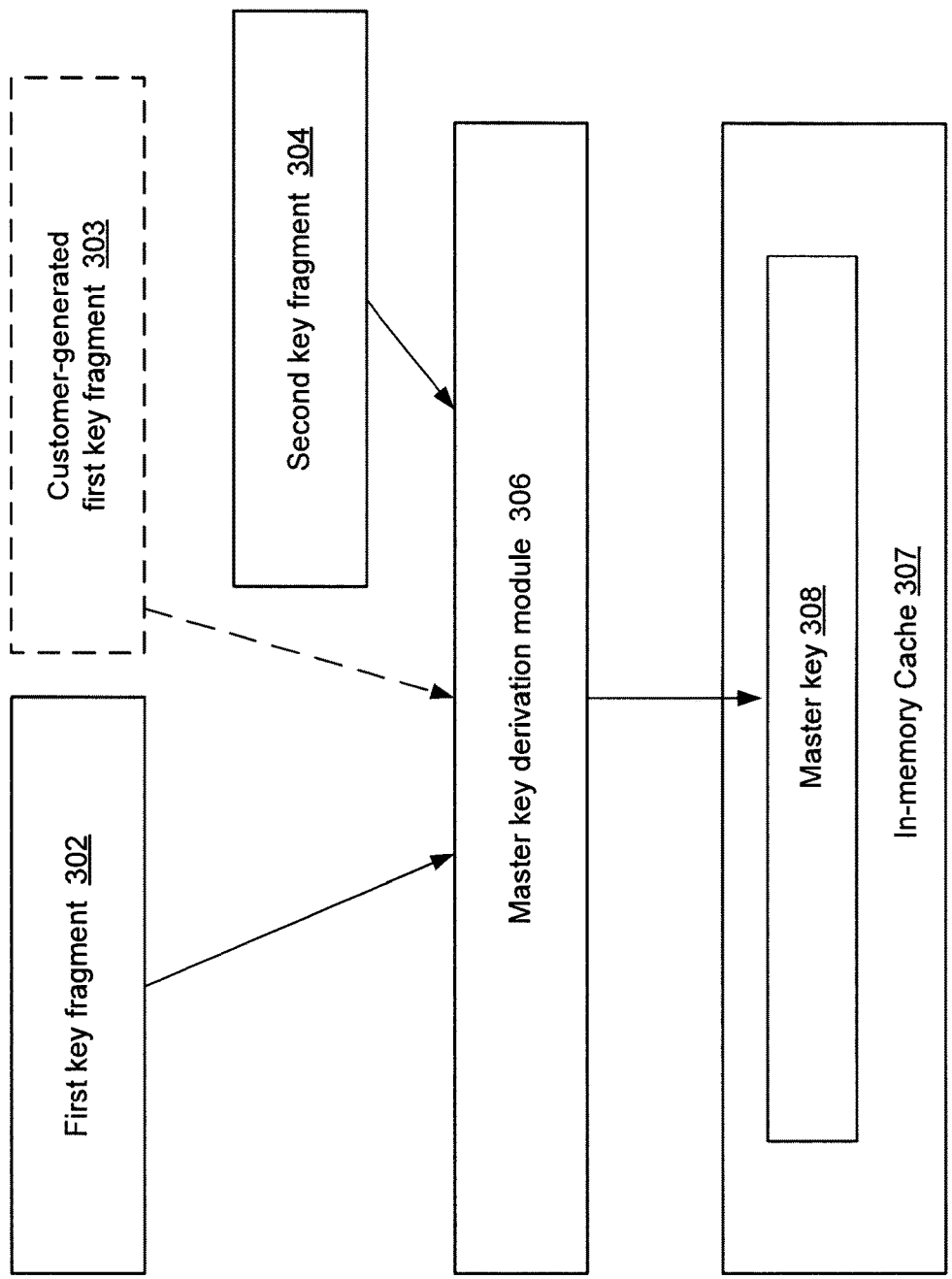
FIG. 3A shows an example of key fragments that may be used to derive a master key for encrypting and decrypting the customer data, in accordance with some embodiments.

FIG. 3A shows an example of key fragments that may be used to derive a master key for encrypting and decrypting the customer data, in accordance with some embodiments. The first key fragment 302 and the second key fragment 304 may be generated using a random number generator. For example, a random number generator may generate key fragments that are 256 bits long. For some embodiments, the first key fragment 302 may be generated by the application server 255 (shown in FIG. 2), and the second key fragment 304 may be generated by the cryptographic computing system 212 (shown in FIG. 2). For some embodiments, both the first key fragment 302 and the second key fragment 304 may be generated by the application server 255. This may help improving the performance in the derivation of the master key 308. For some embodiments, both the first key fragment 302 and second key fragment 304 may be generated by the HSM server 260. This may help with improving the performance and the security of the derived master key 308. The first key fragment 302 may be unique for each customer. The second key fragment 304 may be associated with a particular key release, as described with FIG. 4A.

The first key fragment 302 may be processed by the application server 255. This may include causing the first key fragment 302 to be encrypted and stored in the database 270. The second key fragment 304 may be processed by the HSM server 260. This may include causing the second key fragment 304 to be encrypted and stored in the file system 271 based on data synchronization between the HSM server 260 and the file system 271. Storing the encrypted first key fragment 302 and the encrypted second key fragment 304 in different areas where accessibility is limited to certain personnel protects the first key fragment 302 and the second key fragment 304 from being accessed by unauthorized personnel. For example, only one group of authorized personnel may be able to access first key fragment 302 from the database 270, and only another group of authorized personnel may be able to access the second key fragment 304 from the file system 271, but neither group of authorized personnel has access to both the database 270 and the file system 271. The access may be viewed as mutually exclusive. For some embodiments, only the application server 255 can access the first key fragment 302 from the database 270, and only the HSM server 260 can access the second key fragment 304 from the file system 271.

For some embodiments, instead of using the first key fragment 302, a customer-generated first key fragment 303 may be used. Referring to FIG. 3A, the dotted lines shown with the customer-generated first key fragment 303 are meant to convey an alternative option. The customer-generated first key fragment 303 may be generated using a 256-bit random number generator. The customer-generated first key fragment 303 may be encrypted using the customer's own private key (not shown) and then subsequently decrypted by the application server 255 using the customer's own public key. Alternatively, the customer-generated first key fragment 303 may be encrypted using the public key 273 (shown in FIG. 2) of the entity and then subsequently decrypted using the private key of the entity. The decrypted customer-generated first key fragment 303 may then be received and processed by the application server 255 similarly to how the application server 255 processes the first key fragment 302.

One advantage of using the customer-generated first key fragment 303 is that it enables the customer to have some control over the derivation of the master key 308 (and thus control over the security of the customer data). Even if the customer-generated first key fragment 303 is compromised, the second key fragment 304 may still be secured. Although the following discussion refers to the system-generated first key fragment 302 (or simply first key fragment 302), it is to be understood that the first key fragment can be either system generated or customer generated.

Master Key Derivation

The master key derivation module 306 may be configured to perform operations that combine the decrypted first key fragment 302 and the decrypted second key fragment 304 to derive the master key 308. For some embodiments, the operations may include running multiple loops (e.g., 10,000 loops) through a secure algorithm. The master key 308 may be a symmetric key. The master key derivation module 306 may be configured to perform a Password-Based Key Derivation Function 2 (PBKDF2) algorithm. The PBKDF2 algorithm may apply a pseudorandom function, such as a cryptographic hash, cipher, to the input password or passphrase along with a salt value and repeats the process many times to derive the master key 308. The salt may be generated using a random number generator and used in the PBKDF2 algorithm. The salt may be generated by the HSM server 260.

The master key 308 is unique and is associated with only one customer. This is because the master key derivation module 306 uses two key fragments—the first key fragment 302 and the second key fragment 304—with at least the first key segment 302 being unique for each customer. For some embodiments, the master key derivation module 306 may be included in the HSM server 260. Once the master key 308 is derived, the master key 308 may be encrypted and transmitted to the application server 255. For example, the encryption of the master key 308 may be based on using the CA public key 273. This may protect the master key 308 while it travels through the network 250 (shown in FIG. 2) to the application server 255. The encrypted master key 308 may then be decrypted by the application server 255 using the CA private key 272.

The master key 308 may be temporarily stored in an in-memory cache 307 of the application server 255. Being in the in-memory cache 307 makes it possible for the master key 308 to be accessed quickly by the application server 255, but not by any unauthorized users.

It may be noted that as long as the master key derivation module 306 receives the same the first key fragment 302 and second key fragment 304, the same master key 308 is generated. If the application server 255 is powered off and then powered back on, the master key 308 in the in-memory cache 307 may be lost but can be derived by the master key derivation module 306.

Figure 3B:
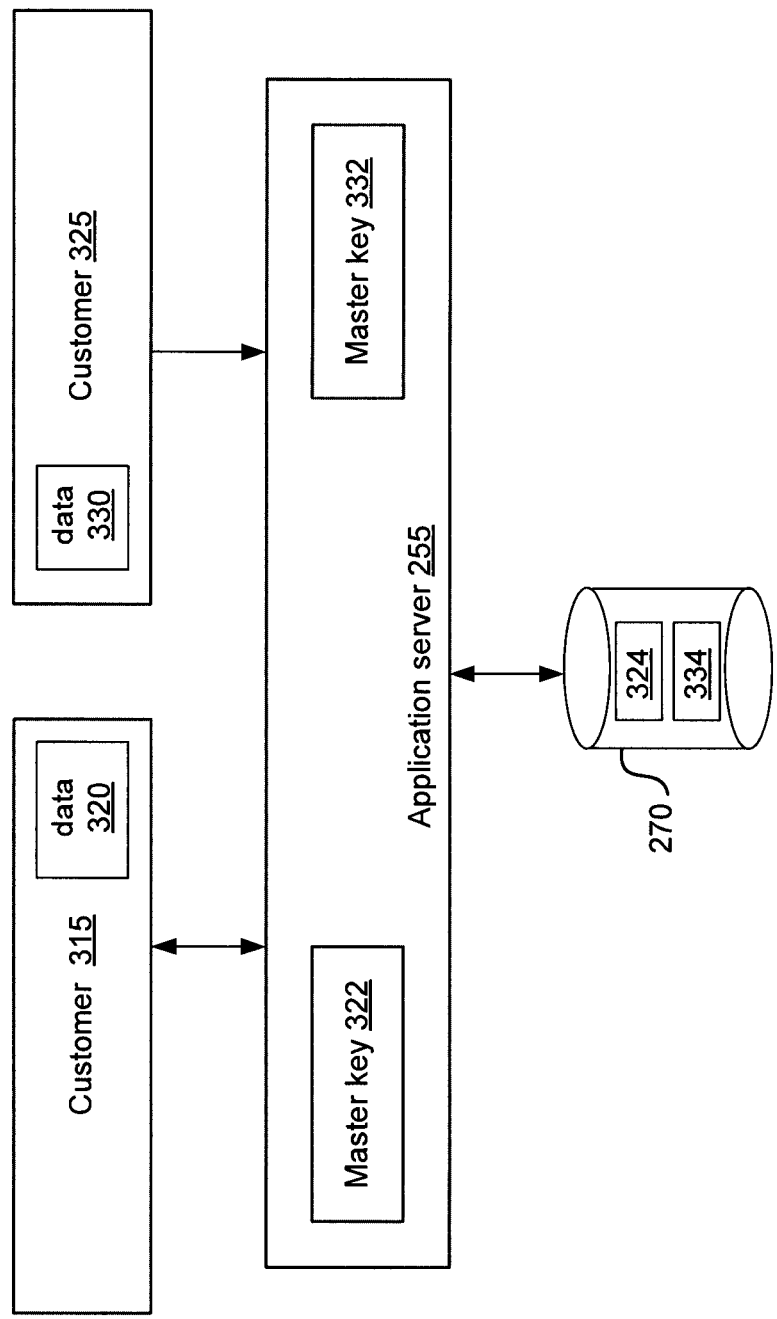
FIG. 3B illustrates an example relationship between a master key and a customer, in accordance with some embodiments.

FIG. 3B illustrates an example relationship between a master key and a customer, in accordance with some embodiments. In this example, there are two customers 315 and 325. During operation, the customer 315 may transmit its customer data 320 to the application server 255. The application server 255 then uses the master key 322 unique to the customer 315 to encrypt the customer data 320 and generate encrypted customer data 324. The encrypted customer data 324 is then saved in the database 270. Subsequently, when the customer 315 requests for its customer data, the encrypted customer data 324 is retrieved from the database 270, decrypted by the application server 255 using the master key 322, and the decrypted customer data 320 is transmitted to the customer 315.

Similarly, the customer 325 may transmit its customer data 330 to the application server 255. The application server 255 then uses the master key 332 unique to the customer 325 to encrypt the customer data 330 and generate encrypted customer data 334. The encrypted customer data 334 is then saved in the database 270. Subsequently, when the customer 325 requests for its customer data, the encrypted customer data 334 is retrieved from the database 270, decrypted by the application server 255 using the master key 332, and the decrypted customer data 330 is transmitted to the customer 325.

When the application server 255 needs to access the master key 322 or 332, the application server 255 may check to find out if the master key 322 or 332 exists in the in-memory cache 307. If the master key 322 or 332 exists the in-memory cache 307, it is accessed and used by the application server 255. If the master key 322 or 332 does not exist in the in-memory cache 307, the application server 255 may request the master key derivation module 306 to derive the master key 322 or 332.

Figure 3C:
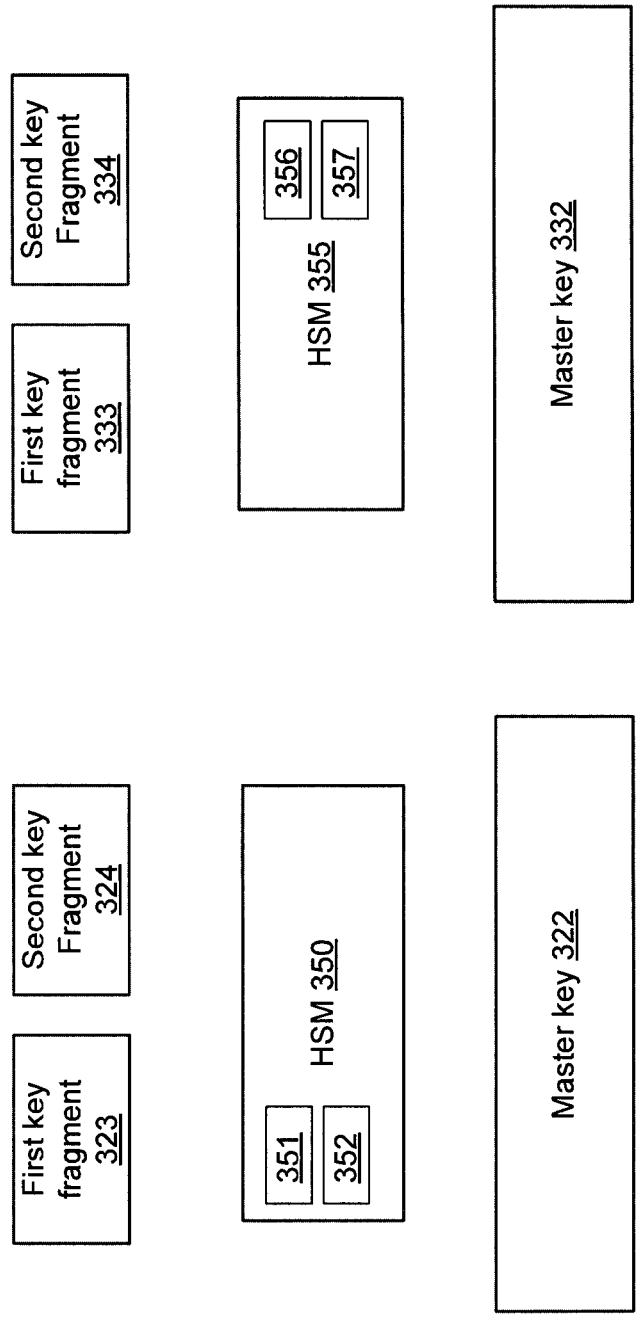
FIG. 3C illustrates an example of encryption using HSM, in accordance with some embodiments.

FIG. 3C illustrates an example of encryption using HSM, in accordance with some embodiments. Since the derivation of the master key 322 or 332 is based on the respective first key fragment 323 or 333 and the respective second key fragment 324 or 334, it is desirable to protect the first key fragments 323, 333, and second key fragments 324, 334. For some embodiments, the first key fragment 323 and the second key fragment 324 may be encrypted using the public key 351 of the HSM 350. Similarly, the first key fragment 333 and the second key fragment 334 may be encrypted using the public key 356 of the HSM 355. The encrypted first key fragments 323 and 333 may be stored in the database 270. The encrypted second key fragments 324 and 334 may be stored in the file system 271. For some embodiments, the first key fragment 323 and the second key fragment 324 may be encrypted and decrypted using two different HSMs. For example, the first key fragment 323 may be encrypted using the public key 351 and then decrypted using the private key 352, while the second key fragment 324 may be encrypted using the public key 356 and then decrypted using the private key 357.

When it is necessary to derive the master key 322, the master key derivation module 306 may receive the encrypted first key fragment 323 from the application server 255. The master key derivation module 306 may query for the encrypted second key fragment 324 from the file system 271. The master key derivation module 306 may decrypt both the encrypted first key fragment 323 and the encrypted second key fragment 324 using the private key 352 of the HSM 350 and then use them to derive the master key 322. Once the master key 322 is derived, it may be transmitted to the application server 255, stored in the in-memory cache 307, and used to encrypt the customer data or to decrypt the encrypted customer data (e.g., customer data 320 shown in FIG. 3B). Similarly, when it is necessary to derive the master key 332, the master key derivation module 306 may receive the encrypted first key fragment 333 from the application server 255. The master key derivation module 306 may query for the encrypted second key fragment 334 from the file system 271. The master key derivation module 306 may decrypt both the encrypted first key fragment 333 and the encrypted second key fragment 334 using the private key 357 of the HSM 355 and then use them to derive the master key 332. Once the master key 332 is derived, it may be transmitted to the application server 255, stored in the in-memory cache 307, and used to encrypt the customer data 330 or to decrypt encrypted customer data (e.g., customer data 330 shown in FIG. 3B).

It may be noted that the derivation of the master keys 322 and 332 depends on the availability of the HSMs 350 and 355 because only the private key 352 of the HSM 350 can be used to decrypt a key fragment that has previously been encrypted using the public key 351 of the HSM 350. Similarly, only the private key 357 of the HSM 355 can decrypt a key fragment that has previously been encrypted using the public key 356 of the HSM 355. If the HSM 350 fails, the private key 357 of the HSM 355 cannot be used to decrypt any key fragments that have been encrypted using the public key 351 of the HSM 350. Similarly, if the HSM 355 fails, the private key 352 of the HSM 350 cannot be used to decrypt any key fragments that have been encrypted using the public key 356 of the HSM 355. It may be possible that either the HSM 350 or HSM 355 may be a single point of failure because the master key and the customer are associated with a particular HSM and its public key and private key.

It may be possible to apply redundancy to decrease the single point of failure issue by increasing the number of HSMs such that a key fragment is also encrypted with the public keys of the redundant HSMs. The multiple encrypted key fragments may then be stored in the database 270. However, this approach can be complex because of having to remember a specific HSM to decrypt a specific encrypted key fragment. Using a public key to encrypt the customer data may have some limitations because the public key cannot be used to encrypt data bigger than its key size. As such, the number of customers that can be supported may be limited.

Figure 4A:
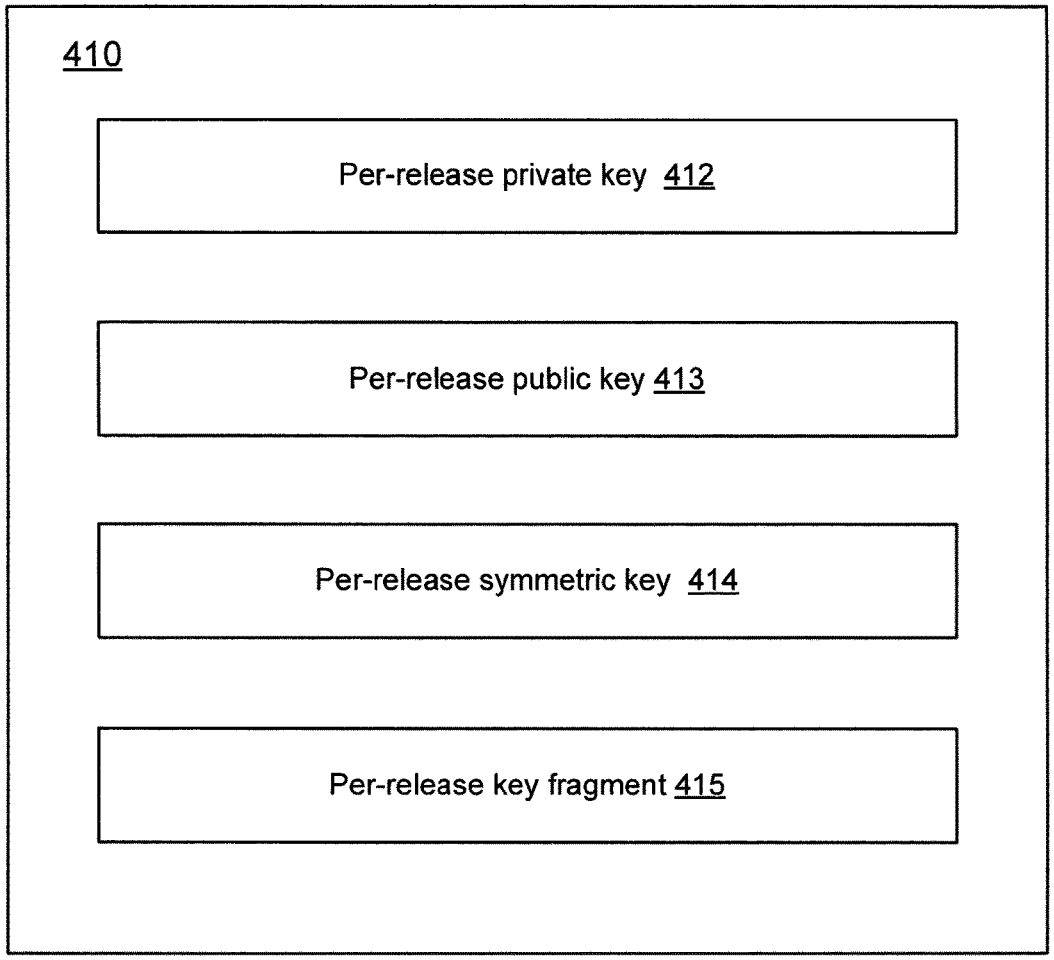
FIG. 4A illustrates an example of encryption using a key release, in accordance with some embodiments.

FIG. 4A illustrates an example of encryption using a key release, in accordance with some embodiments. The key release may be used to enable encryption where the customer is not associated with a particular HSM, making it possible to support many customers. For some embodiments, the cryptographic computing system 212 may be configured to generate a key set with multiple keys (or seeds) 410. The key set 410 may be associated with a key release. There may be one or more key releases. The key set 410 may be used for any customers. When there are multiple key releases, each key release is associated with its own key set 410.

The key set 410 may include a per-release private key 412, per-release public key 413, per-release symmetric key 414, and per-release key fragment 415. The per-release key fragment 415 may be used as the second key fragment similar to the second key fragment 304 (shown in FIG. 3A) to derive the master key 308. Since there is a different first key fragment 302 for each customer, a different master key 308 will be derived for each customer even though the same per-release key fragment 415 is used as the second key fragment 304.

Figure 4B:
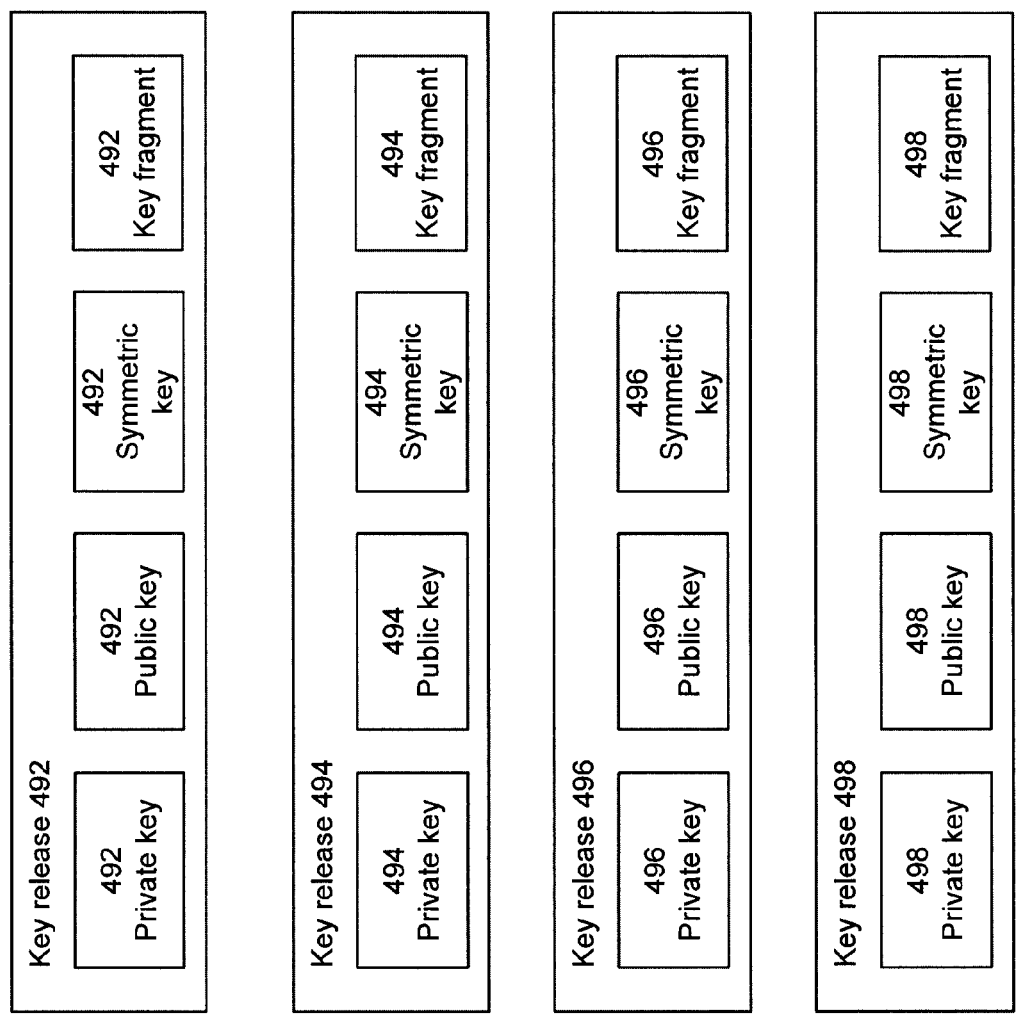
FIG. 4B illustrates an example of multiple key releases, in accordance with some embodiments.

FIG. 4B illustrates an example of multiple key releases, in accordance with some embodiments. The number of key releases may be unlimited. For example, the multiple key releases may include key releases 492, 494, 496 and 498. The key set for the key release 492 may include a public key, a private key, a symmetric key, and a key fragment. Similarly, the key set for the key releases 494, 496 and 498 are shown in FIG. 4B. A key release may be periodically changed. For example, the key release 492 may be set to be active quarterly, followed by the key releases 494, 496 and 498. For some embodiments, a customer may have the option to use or change to a particular key release. For example, even though the key release 494 is the currently active key release, a customer may request that the key release 498 be used as the currently active key release. For some embodiments, any available key release can be used as an active key release.

For some embodiments, the cryptographic computing system 212 may export the keys in the key set 410 (shown in FIG. 4A) to the HSM server 260. Each of the keys in the key set 410 may be encrypted using the public key 267 of the HSM 266 and transmitted to the HSM server 260. The HSM server 260 may them decrypt them using the private key 268 of the HSM 266 (shown in FIG. 2). This may protect the integrity of the keys in the key set 410 when they are transmitted to the HSM sever 260.

The HSM server 260 may store the per-release private key 412, per-release public key 413, per-release symmetric key 414, and per-release key fragment 415 in the file system 271. Key release information (or seed information) such as, for example, information associated with the key release 492, may also be exported with the key set 410. The key release information may be used to determine the correct keys to retrieve from the file system 271 to derive the master key 308.

For some embodiments, the key set 410 may be configured to be geo-specific such that the per-release key fragment 415 can only be used to derive the master key 308 for customers in a specific geographic location. For example, a geo-specific code may be part of the per-release key fragment 415 such that only the HSM server 255 located in the same geographic location can process the per-release key fragment 415.

Figure 5:
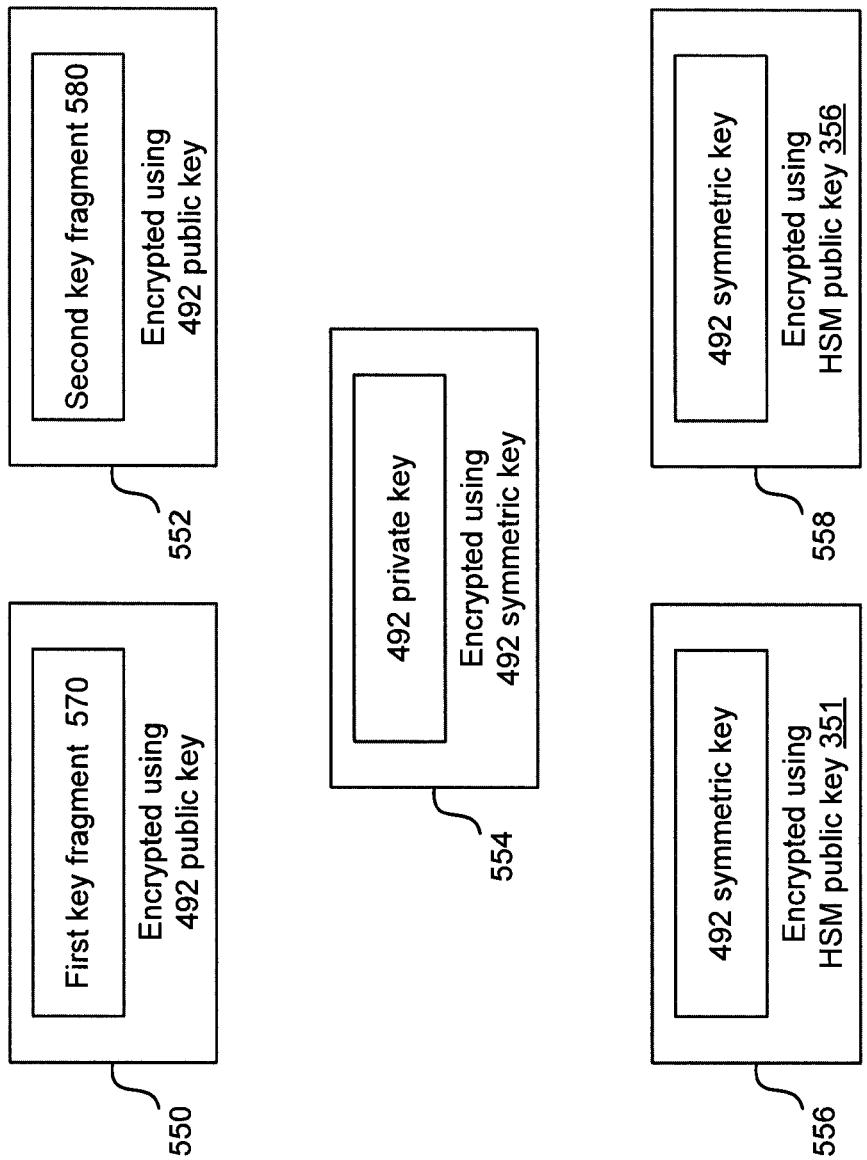
FIG. 5 illustrates an examples of using the keys in a key release to implement encryption, in accordance with some embodiments.

FIG. 5 illustrates an examples of using the keys in a key release to implement encryption, in accordance with some embodiments. In this example, the key release 492 and the public keys 351, 356 and private keys 352, 357 of the HSM 350 and 355 are used illustrate the encryption. As shown in blocks 550 and 552, the public key of the key release 492 may be used to encrypt the first key fragment 570 and the second key fragment 580. The key fragment of the key release 492 is used in this example as the second key fragment 580. The encrypted first key fragment 570 may then be stored in the database 270 (shown in FIG. 2). The encrypted second key fragment 580 may then be stored in the file system 271.

As shown in block 554, the private key of the key release 492 (that can be used to decrypt the first key fragment 570 and the second key fragment 580) is encrypted using the symmetric key of the key release 492. As shown in blocks 556 and 558, the symmetric key of the key release 492 (that is used to encrypt the private key of the key release 492) is itself encrypted using the public key 351 of the HSM 350 and the public key 356 of the HSM 355 (shown in FIG. 3C). The encrypted private key of the key release 492 (shown in block 554) and the encrypted symmetric key of the key release 492 (shown in blocks 556 and 558) may be stored in the file system 271.

For some embodiments, the symmetric key of the key release 492 may be used to encrypt the first key fragment 570 and the second key fragment 580, and to decrypt the encrypted first key fragment 570 and the encrypted second key fragment 580. The encrypted first key fragment 570 may then be stored in the database 270 (shown in FIG. 2). The encrypted second key fragment 580 may then be stored in the file system 271.

When there is a need to derive a master key 308, the application server 255 may transmit the encrypted first key fragment 570 to the HSM server 260. The application server 255 may also indicate to the HSM server 260 that the relevant key release is the key release 492. The HSM server 260 may retrieve the encrypted second key fragment 580 from the file system 271. The HSM server 260 needs the private key of the key release 492 to decrypt the encrypted first key fragment 570 and the encrypted second key fragment 580.

As described above, the private key of the key release 492 is encrypted using the symmetric key of the key release 492. In order to decrypt the encrypted private key of the key release 492, the HSM server 260 needs to determine the symmetric key of the key release 492. The HSM server 260 can use either the HSM 350 and its private key 352 or the HSM 355 and its private key 357 to decrypt the encrypted symmetric key of the key release 492. The HSM server 260 then uses the decrypted symmetric key of the key release 492 to decrypt the encrypted private key of the key release 492. With the decrypted private key of the key release 492, the HSM server 260 can decrypt the encrypted first key fragment 570 and the encrypted second key fragment 580 and derive the master key 308.

When there are multiple HSM servers (such as HSM server 260) and multiple application servers (such as application server 255), any HSM server 260 can get the private key of the key release 492 using this approach and can process requests from any application server 255. Instead of encrypting the first key fragment 570 and the second key fragment 580 using the public key 351 of the HSM 350 (as shown in FIG. 3C), the first key fragment 570 and the second key fragment 580 are encrypted using the public key of the key release 492. It's a level of indirection which allows either the HSM 350 or 355 to use its private key 352 or 356 to decrypt the symmetric key of the key release 492 to get to the first and second key fragments 570 and 580.

It may be noted that because the symmetric key of the key release 492 is encrypted using the public keys 351, 356 of the HSMs 350 and 355, the encrypted symmetric key of the key release 492 can be decrypted using either the private key 352 of the HSM 350 or the private key 357 of the HSM 355. If the HSM 350 fails, the decrypted symmetric key of the key release 492 can be retrieved using the HSM 355. If a new HSM is added, the symmetric key of the key release 492 is encrypted using the public key of the new HSM. Thus, if there are ten HSMs, the symmetric key of the key release 492 would be encrypted by using the public keys of the ten HSMs, and the ten encrypted symmetric keys can be stored in the file system 271.

The private key of any of the ten HSMs can be used to decrypt the appropriate encrypted symmetric key of the key release 492. It may not be necessary to know the private keys of all of the participating HSMs to decrypt the appropriate encrypted symmetric key. As long as the decrypted symmetric key of the key release 492 can be obtained, the decrypted private key of the key release 492 can be obtained. Using the decrypted private key of the key release 492, the decrypted first and second key fragments 570 and 580 can be obtained to derive the necessary master key. This approach removes the single point of failure. For some embodiments, it may be possible to use the private key and public key of the same HSM to encrypt and decrypt symmetric keys associated with different customers.

It may be noted that when the key release is changed from the key release 492 to the key release 494, the per-release key fragment is changed (from the key fragment of the key release 492 to the key fragment of the key release 494). Because the key fragment of the key release 494 is used as the second key fragment 480, this may cause a different master key to be derived. For some embodiments, a customer may be associated with multiple master keys (based on different key releases), but there is only one active master key for that customer at a time. The other master keys may still be required to decrypt the customer data that was previously encrypted with those same master keys. If either of the first key fragment 570 or the second key fragment 580 associated with a master key is lost or destroyed, it may not be possible to decrypt the customer data that was previously encrypted with that same master key. Having multiple releases may add another level of security to the protection of the customer data since it may not be as secured to use the same key set from a certain key release for encrypting all of the customer data.

For some embodiments, the cryptographic computing system 212 may be configured to store the keys (e.g., per-release symmetric keys, per-release key fragments, etc.) that it generates for each key release. The cryptographic computing system 212 may include an HSM 215 (shown in FIG. 2) to encrypt the keys in the key releases using the public key of the HSM 215 and to decrypt those keys using the private key of the HSM 215. Access to the cryptographic computing system 212 may be limited only to certain authorized personnel. For some embodiments, the cryptographic computing system 212 may be switched to an offline state (e.g., by powering off or by disconnecting from the network) after exporting the keys in a key release to the HSM server 260. Being in the offline state may prevent the cryptographic computing system 212 from being accessed by unauthorized users.

Flow Diagram

Figure 6A:
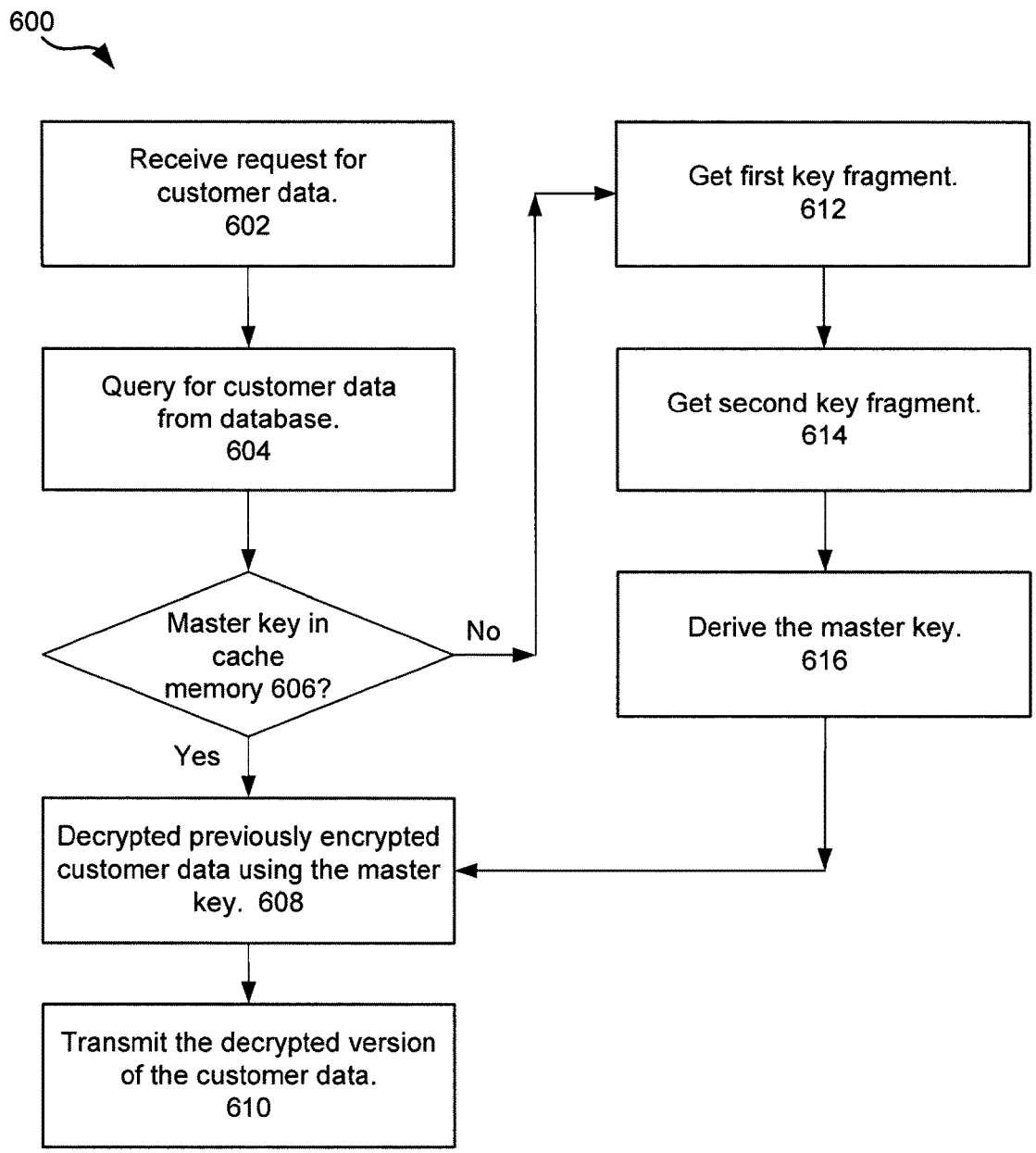
FIG. 6A shows a flowchart of an example process for processing a request for customer data, performed in accordance with some embodiments.

FIG. 6A shows a flowchart of an example process for processing a request for customer data, performed in accordance with some embodiments. The process 600 may be performed by an application server 255 (shown in FIG. 2) and is described using the keys included in the key release 492 (shown in FIG. 4B) and the HSM 350 (shown in FIG. 3C). The request may be made by a user using the customer computing system 205 via an application program interface (API) or a user interface (UI). At block 602, the request is received by the application server 255. The customer data may be stored in the database 270, and it may have been encrypted with a master key 308 associated with the customer. At block 604, the application server 255 may query the customer data from the database 270.

At block 606, the application server 255 may check to find out if the master key 308 exists in the in-memory cache 307 of the application server 255. If the master key 308 is found, the process may flow to block 608 where the customer data is decrypted using the master key 308. At block 610, the decrypted customer data is transmitted to the user.

From block 606, if the application server 255 cannot find the master key 308 in the in-memory cache 307, the master key 308 needs to be derived. This requires the application server 255 to query for the encrypted first key fragment 302 from the database 270, as shown in block 612. The first key fragment 302 has previously been encrypted using the public key of the key release 492. The application server 255 transmits the encrypted first key fragment 302 to the HSM server 260 and requests for the master key 308 to be derived. The application server 255 may also transmit other information to the HSM server 260. This may include customer identification information, key release information.

At block 614, the HSM server 260 may query for the second key fragment 304 from the file system 271. The second key fragment 304 has previously been encrypted using the public key of the key release 492.

At block 616, the generation of the master key 308 may be performed by the master key derivation module 306 (shown in FIG. 3) in the HSM server 260. The master key derivation module 306 may use the decrypted first key segment 302 and decrypted second key segment 304 to derive and store the master key 308 in the in-memory cache 307. The decrypted first key segment 302 and the decrypted second key segment 304 may be obtained by using the private key of the HSM 350 and the symmetric key of the key release 492. The process then continues to block 608 where the customer data is decrypted and block 610 where the customer data is transmitted to the customer.

Figure 6B:
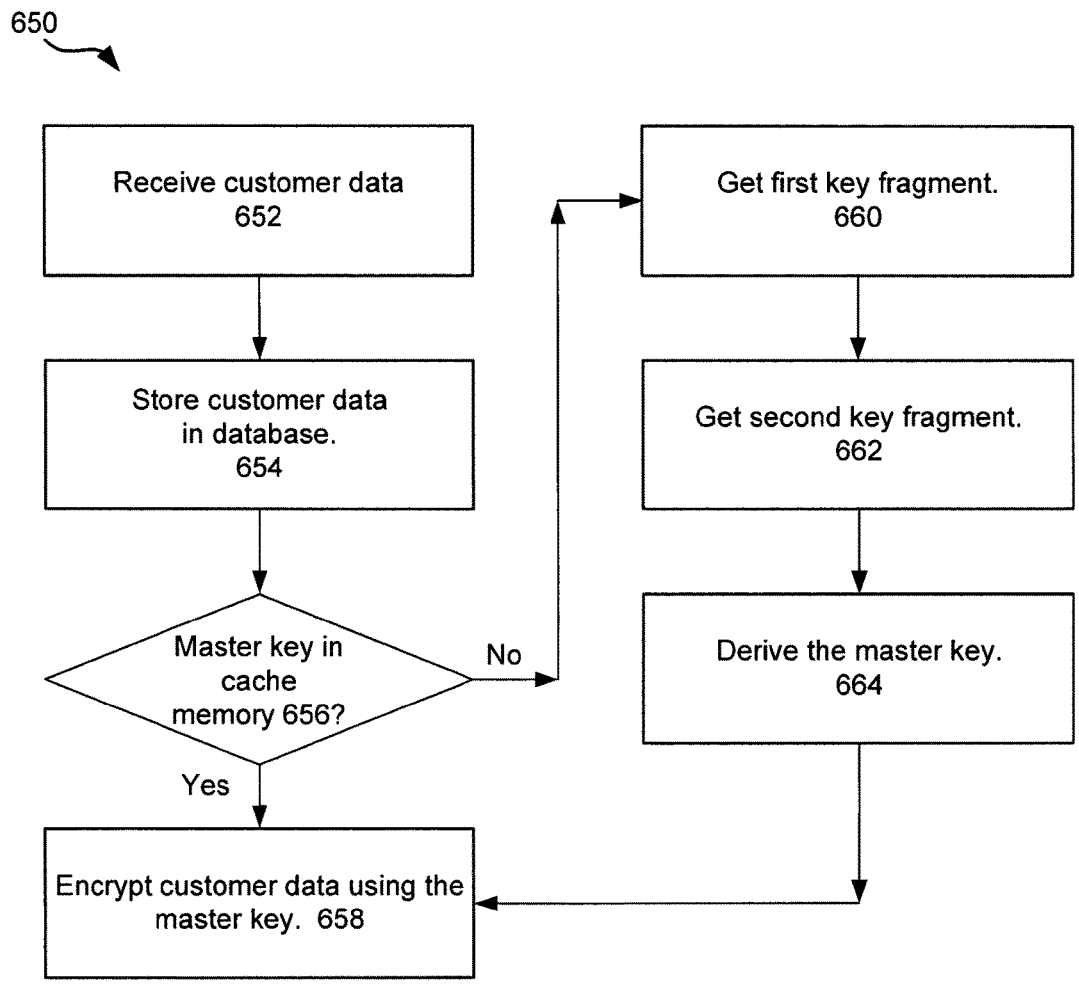
FIG. 6B shows a flowchart of an example process for encrypting customer data, performed in accordance with some embodiments.

FIG. 6B shows a flowchart of an example process for encrypting customer data, performed in accordance with some embodiments. The process 650 may be performed by an application server 255 (shown in FIG. 2) and is described using the keys included in the key release 492 (shown in FIG. 4B) and the HSM 350 (shown in FIG. 3C). At block 652, the customer data is received by the application server 255. At block 654, the customer data is stored in the database 270.

At block 656, the application server 255 may check to find out if the master key 308 exists in the in-memory cache 307 of the application server 255. If the master key 308 is found, the process may flow to block 658 where the customer data is encrypted using the master key 308 and stored in the database 270.

From block 656, if the application server 255 cannot find the master key 308 in the in-memory cache 307, the master key 308 needs to be derived. This requires the application server 255 to query for the encrypted first key fragment 302 from the database 270, as shown in block 660. The first key fragment 302 has previously been encrypted using the public key of the key release 492. The application server 255 transmits the encrypted first key fragment 302 to the HSM server 260 and requests for the master key 308 to be derived. The application server 255 may also transmit other information to the HSM server 260. This may include customer identification information, key release information.

At block 662, the HSM server 260 may query for the second key fragment 304 from the file system 271. The second key fragment 304 has previously been encrypted using the public key of the key release 492.

At block 664, the generation of the master key 308 may be performed by the master key derivation module 306 (shown in FIG. 3) in the HSM server 260. The master key derivation module 306 may use the decrypted the first key segment 302 and the decrypted second key segment 304 to derive and store the master key 308 in the in-memory cache 307. The decrypted first key segment 302 and the decrypted second key segment 304 may be obtained by using the private key of the HSM 350 and the symmetric key of the key release 492. The process then continues to block 658 where the customer data is encrypted.

Figure 7A:
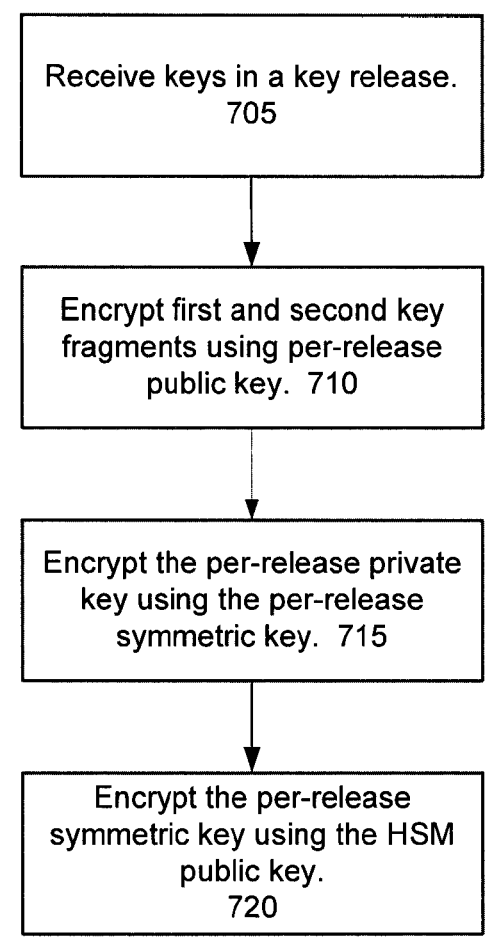
FIG. 7A shows a flowchart of an example process for performing encryption, performed in accordance with some embodiments.

FIG. 7A shows a flowchart of an example process for performing encryption, performed in accordance with some embodiments. The process 700 may be performed by an HSM server 260 (shown in FIG. 2) and is described using the keys included in the key release 492 (shown in FIG. 4B) and the HSM 350 (shown in FIG. 3C). At block 705, the keys in the key release 492 are received by the HSM server 260. The keys in the key release 492 may have been generated by the cryptographic computing system 212 (shown in FIG. 2). At block 710, the HSM server 260 may encrypt the first key fragment 302 and the second key fragment 304 (which is the same as the key fragment of the key release 492) using the public key of the key release 492 and store them in the file system 271. At block 715, the HSM server 260 encrypts the private key of the key release 492 with the symmetric key of the key release 492 and store it in the file system 271. At block 720, the HSM server 260 encrypts the symmetric key of the key release 492 with the HSM public key of the HSM 350 and store it in the file system 271.

Figure 7B:
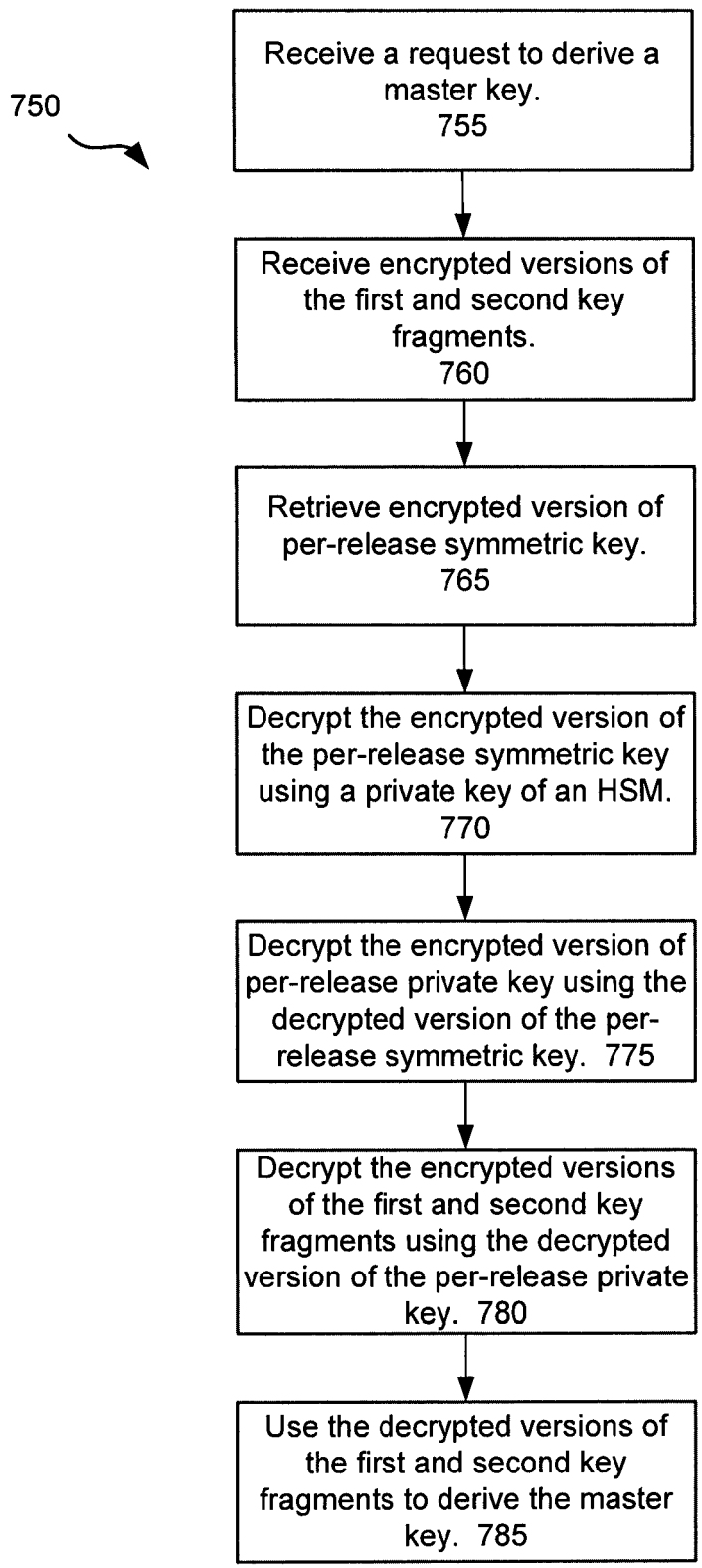
FIG. 7B shows a flowchart of an example process for generating a master key, performed in accordance with some embodiments.

FIG. 7B shows a flowchart of an example process for generating a master key, performed in accordance with some embodiments. The process 750 may be performed by an HSM server 260 (shown in FIG. 2) and is described using the keys included in the key release 492 (shown in FIG. 4B) and the HSM 350 (shown in FIG. 3C).

At block 755, the HSM server 260 may receive a request to derive the master key 308. The request may be initiated by the application server 255.

At block 760, the HSM server 260 may receive an encrypted the first key fragment 302 and key release information from the application server 255. The first key fragment 302 has been previously encrypted using the public key of the key release 492. The HSM server 260 may retrieve an encrypted second key fragment 304 from the file system 271. The second key fragment 304 has been previously encrypted using the public key of the key release 492.

At block 765, the HSM server 260 may retrieve an encrypted symmetric key of the key release 492 from the file system 271. The encrypted symmetric key of the key release 492 has been previously encrypted using the public key 351 of the HSM 350.

At block 770, the symmetric key of the key release 492 may then be decrypted using the private key 352 of the HSM 350.

At block 775, the decrypted symmetric key of the key release 492 may be used to decrypt the private key of the key release 492. The private key of the key release 492 has been previously encrypted using the symmetric key of the key release 492.

At block 780, the decrypted private key of the key release 492 may be used to decrypt the first key fragment 302 and the second key fragment 304. The first key fragment 302 and the second key fragment 304 have previously been encrypted using the public key of the key release 492.

At block 785, the decrypted first key fragment 302 and the decrypted second key fragment 304 may then be used by the master key derivation module 306 to derive the master key 308.

Figure 8A:
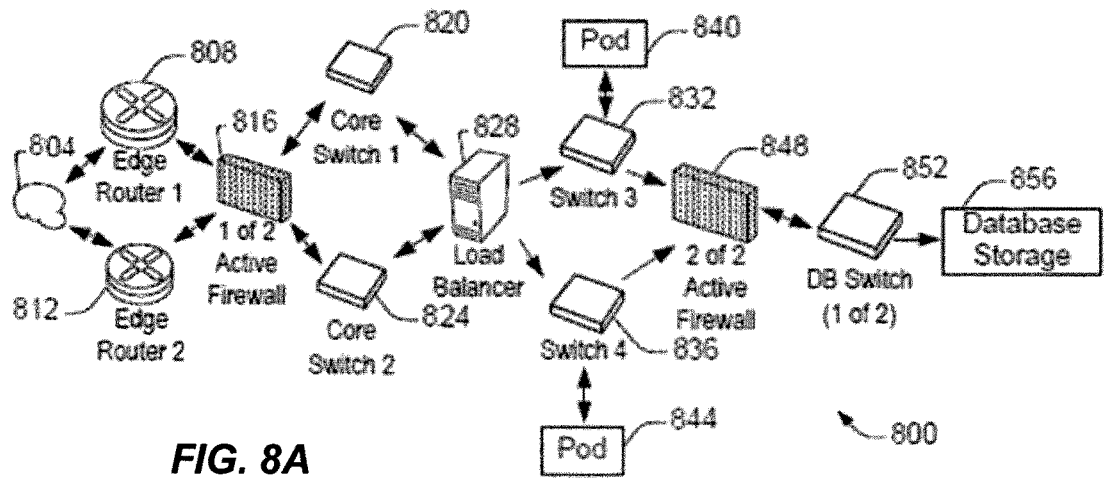
FIG. 8A shows a system diagram 800 illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
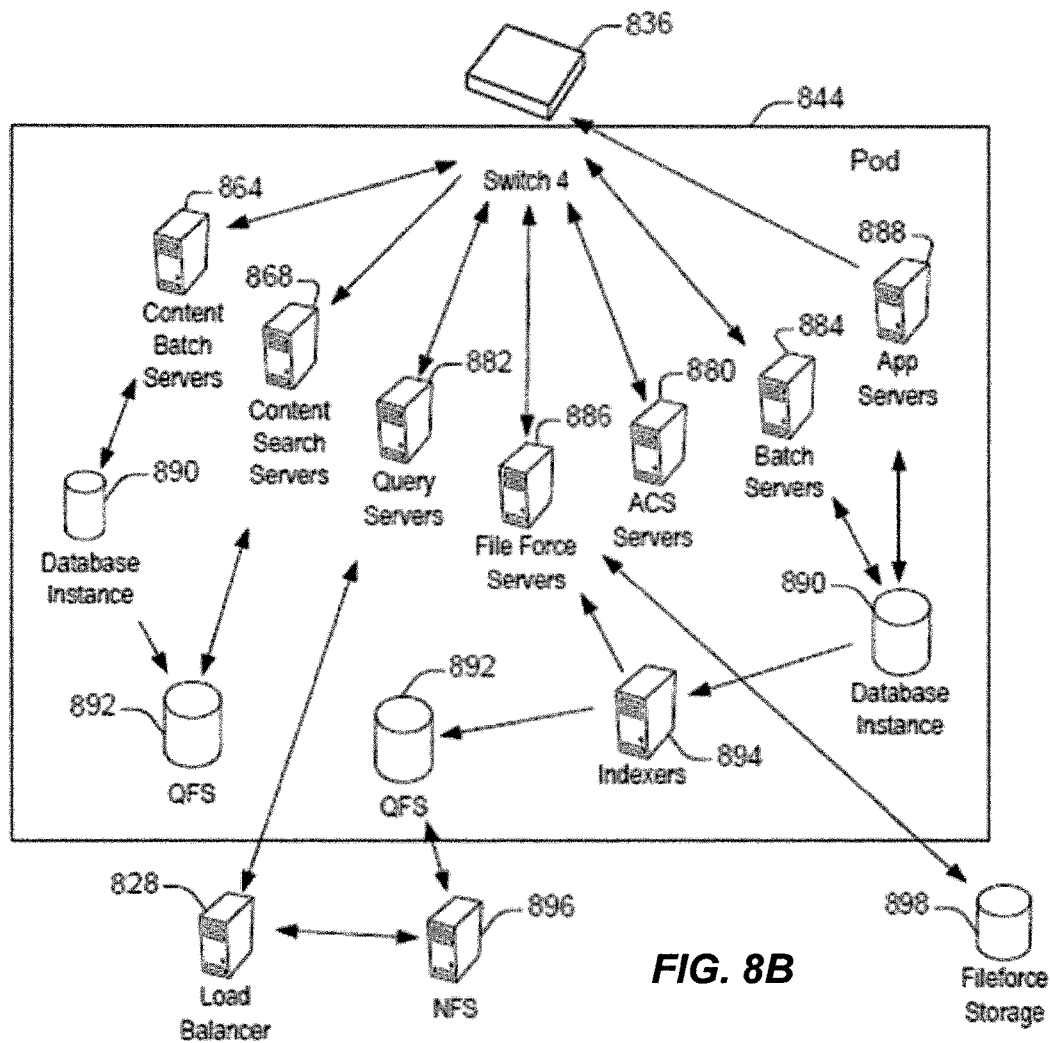
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
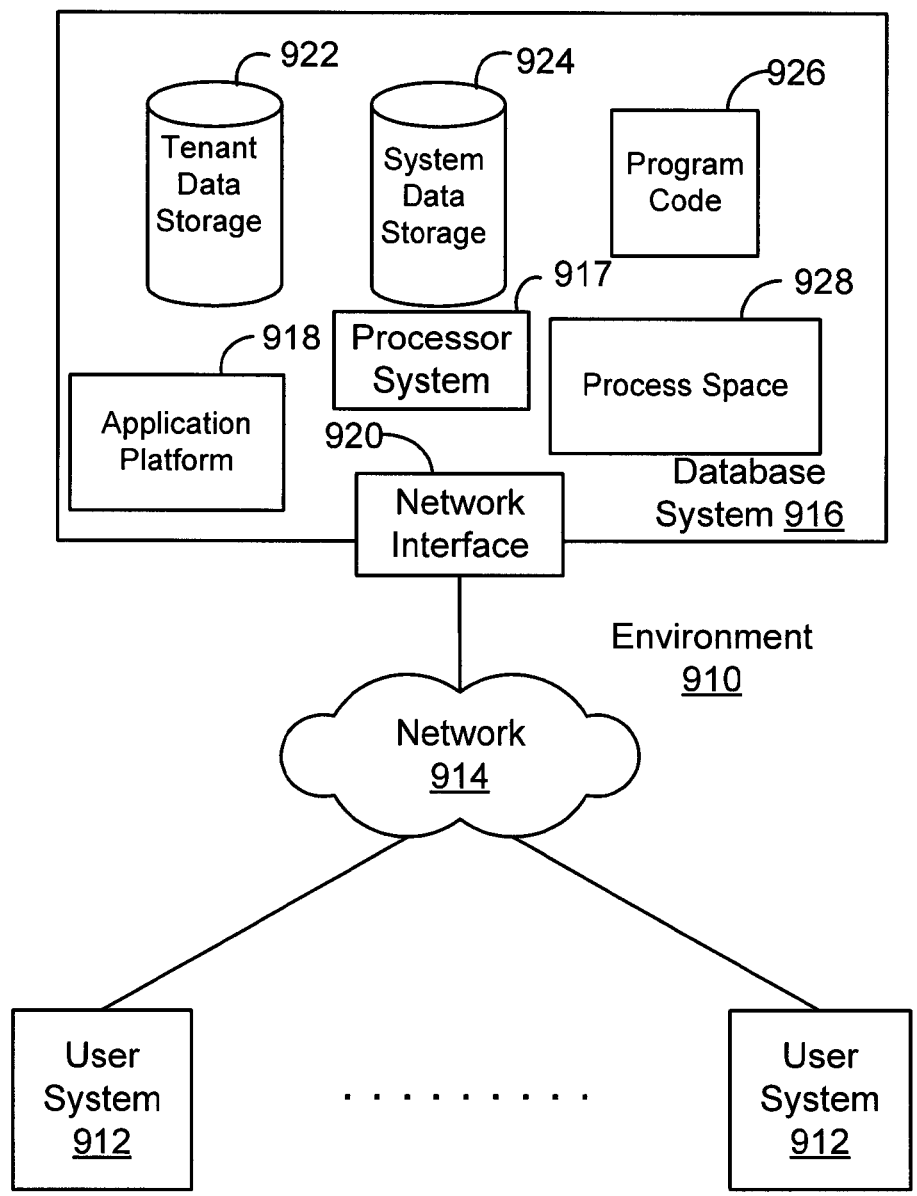
FIG. 9 shows a system diagram 910 illustrating the architecture of a multitenant database environment, in accordance with some embodiments.
Figure 10:
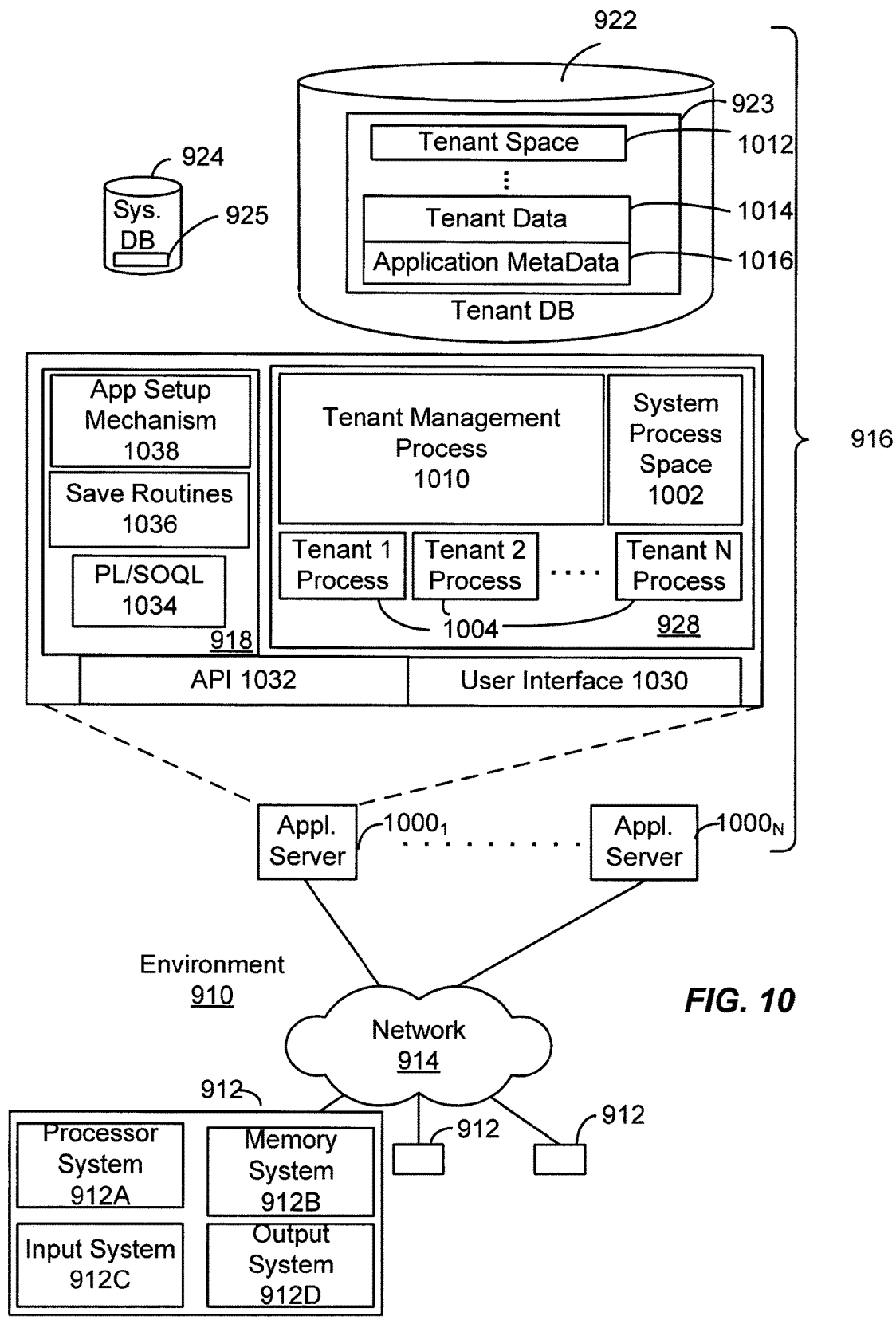
FIG. 10 shows a system diagram 910 further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as the Internet Explorer® browser by Microsoft®, the Firefox® browser by Mozilla®, the Opera® browser by Opera®, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 1000₁-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM® and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method for securing customer data, the method comprising:

storing, by a security server, an encrypted second key fragment in a second storage area, an encrypted first key fragment being stored in a first storage area distinct from the second storage area, further wherein access to the first storage area and to the second storage area is mutually exclusive and the first key fragment is unique to a customer having access to the encrypted first key fragment;

receiving, by the security server, a request from an application server in communication with the customer, to derive a new master key, the request being received after the storing the encrypted second key fragment;

receiving, by the security server, the encrypted first key fragment from the application server;

retrieving, by the security server, the encrypted second key fragment from the second storage area;

decrypting, by the security server, the encrypted first key fragment and the encrypted second key fragment using at least a hardware security module (HSM) to generate a decrypted first key fragment and a decrypted second key fragment;

deriving, by the security server, the new master key using the decrypted first key fragment and the decrypted second key fragment, the deriving comprising modifying the decrypted first key fragment and subsequently combining the modified decrypted first key fragment and the decrypted second key fragment, the new master key being unique to the customer; and transmitting, by the security server, the derived new master key to the requesting application server, the new master key being stored in an in-memory cache of the application server enabling the application server to encrypt customer data stored on the application server.

2. The method of claim 1, wherein the encrypted first key fragment and the encrypted second key fragment are further decrypted using a key set comprising a public key, a private key, and a symmetric key, and wherein the HSM includes an HSM public key and an HSM private key.

3. The method of claim 2, further comprising:

decrypting an encrypted symmetric key associated with the key set using the HSM private key to generate a decrypted symmetric key associated with the key set, the encrypted symmetric key associated with the key set previously encrypted using the HSM public key; and decrypting an encrypted private key associated with the key set using the decrypted symmetric key associated with the key set to generate a decrypted private key associated with the key set, the encrypted private key associated with the key set previously encrypted using the symmetric key associated with the key set.

4. The method of claim 3, wherein the encrypted first key fragment and the encrypted second key fragment are decrypted using the associated key set.

5. The method of claim 4, wherein the first key fragment and the second key fragment are generated using a random number generator, and wherein the encrypted symmetric key associated with the key set and the encrypted private key associated with the key set are stored in the second storage area.

6. The method of claim 5, wherein the first key fragment is generated by a customer associated with the customer data.

7. The method of claim 5, further comprising using the master key to encrypt the customer data or to decrypt encrypted customer data.

8. The method of claim 5, wherein the key set is associated with a key release of one or more key releases, wherein each key release comprises a per-release public key, a per-release private key, a per-release symmetric key, and a per-release key fragment, and wherein the per-release key fragment of a particular key release is used as the second key fragment.

9. An apparatus for securing customer data comprising:
one or more processors of a security server; and a non-transitory computer readable medium storing a plurality of instructions, which when executed, cause the one or more processors to:

store an encrypted second key fragment in a second storage area, an encrypted first key fragment being stored in a first storage area distinct from the second storage area, further wherein access to the first storage area and to the second storage area is mutually exclusive and the first key fragment is unique to a customer having access to the encrypted first key fragment;

receive a request from an application server in communication with the customer, to derive a new master key, the request being received after the storing the encrypted second key fragment;

receive the encrypted first key fragment from the application server;

retrieve the encrypted second key fragment from the second storage area;

decrypt the encrypted first key fragment and the encrypted second key fragment using at least a hardware security module (HSM) to generate a decrypted first key fragment and a decrypted second key fragment;

derive the new master key using the decrypted first key fragment and the decrypted second key fragment, the deriving comprising modifying the decrypted first key fragment and subsequently combining the modified decrypted first key fragment and the decrypted second key fragment, the new master key being unique to the customer; and transmit the derived new master key to the requesting application server, the new master key being stored in an in-memory cache of the application server enabling the application server to encrypt customer data stored on the application server.

10. The apparatus of claim 9, wherein the encrypted first key fragment and the encrypted second key fragment are further decrypted by (a) decrypting an encrypted symmetric key associated with a key set using an HSM private key to generate a decrypted symmetric key, the encrypted symmetric key previously encrypted using an HSM public key, and (b) decrypting an encrypted private key associated with the key set using the decrypted symmetric key to generate a decrypted private key associated with the key set, the encrypted private key previously encrypted using the symmetric key associated with the key set.

11. The apparatus of claim 10, wherein the encrypted first key fragment and the encrypted second key fragment are decrypted using the decrypted private key associated with the key set.

12. The apparatus of claim 11, wherein the first key fragment is generated using a random number generator of a first server computing system associated with the first storage area, wherein the second key fragment is generated using a random number generator of a second server computing system coupled with the first server computing system and associated with the second storage area, and wherein the encrypted symmetric key associated with the key set and the encrypted private key associated with the key set are stored in the second storage area.

13. The apparatus of claim 12, wherein the first key fragment is generated by a customer associated with the customer data.

14. The apparatus of claim 12, wherein the master key is used to encrypt the customer data or to decrypt encrypted customer data.

15. The apparatus of claim 14, wherein the key set is associated with a key release of one or more key releases, wherein each key release includes a per-release public key, a per-release private key, a per-release symmetric key, and a per-release key fragment, and wherein the per-release key fragment of a particular key release is used as the second key fragment.

16. A non-transitory computer-readable medium having computer-readable program code embodied therein to be executed by one or more processors of a security server, the program code including instructions to:

store an encrypted second key fragment in a second storage area, an encrypted first key fragment being stored in a first storage area distinct from the second storage area, further wherein access to the first storage area and to the second storage area is mutually exclusive and the first key fragment is unique to a customer having access to the encrypted first key fragment;

receive a request from an application server in communication with the customer, to derive a new master key, the request being received after the storing the encrypted second key fragment;

receive the encrypted first key fragment from the application server;

retrieve the encrypted second key fragment from the second storage area;

decrypt the encrypted first key fragment and the encrypted second key fragment using at least a hardware security module (HSM) to generate a decrypted first key fragment and a decrypted second key fragment;

derive the new master key using the decrypted first key fragment and the decrypted second key fragment, the deriving comprising modifying the decrypted first key fragment and subsequently combining the modified first key decrypted fragment and the decrypted second key fragment, the new master key being unique to the customer; and transmit the derived new master key to the requesting application server, the new master key being stored in an in-memory cache of the application server enabling the application server to encrypt customer data stored on the application server.

17. The computer program product of claim 16, wherein the encrypted first key fragment and the encrypted second key fragment are further decrypted using a key set comprising a public key, a private key, and a symmetric key, and wherein the HSM includes an HSM public key and an HSM private key.

18. The computer program product of claim 17, further comprising instructions to cause the one or more processors to:

decrypt an encrypted symmetric key associated with the key set using the HSM private key to generate a decrypted symmetric key associated with the key set, the encrypted symmetric key associated with the key set previously encrypted using the HSM public key; and decrypt an encrypted private key associated with the key set using the decrypted symmetric key associated with the key set to generate a decrypted private key associated with the key set, the encrypted private key associated with the key set previously encrypted using the symmetric key associated with the key set.

19. The computer program product of claim 18, wherein the encrypted symmetric key associated with the key set and the encrypted private key associated with the key set are stored in the second storage area, wherein the first key fragment and the second key fragment are generated using a random number generator, and wherein the master key is used to encrypt the customer data or to decrypt encrypted customer data.

* * * * *